US008249758B2

(12) United States Patent
Schugart et al.

(10) Patent No.: US 8,249,758 B2
(45) Date of Patent: Aug. 21, 2012

(54) CENTRALIZED POWER CONDITIONING

(75) Inventors: Perry S. Schugart, Dousman, WI (US);
William Vareka, Verona, WI (US);
Narendra Reddy, Fitchburg, WI (US)

(73) Assignee: American Superconductor Corporation, Devens, MA (US)

( * ) Notice: Subject to any disclaimer, the term of this patent is extended or adjusted under 35 U.S.C. 154(b) by 0 days.

(21) Appl. No.: 13/267,326

(22) Filed: Oct. 6, 2011

(65) Prior Publication Data

US 2012/0029723 A1     Feb. 2, 2012

Related U.S. Application Data

(60) Provisional application No. 61/392,139, filed on Oct. 12, 2010.

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05F 5/00 | (2006.01) |
| F03D 9/00 | (2006.01) |
| H02P 9/04 | (2006.01) |

(52) U.S. Cl. ........ 700/298; 700/295; 700/297; 323/205; 323/207; 290/44; 290/54

(58) Field of Classification Search .......... 700/286–287, 700/291, 295, 297–298; 290/43–44, 54–55; 323/205, 207–211

See application file for complete search history.

(56) References Cited

U.S. PATENT DOCUMENTS

| 5,572,438 | A | * | 11/1996 | Ehlers et al. | ................... 700/295 |
| 6,360,177 | B1 | * | 3/2002 | Curt et al. | ........................ 702/64 |
| 6,362,540 | B1 | * | 3/2002 | Hill | ................................ 307/52 |
| 6,924,565 | B2 | | 8/2005 | Wilkins et al. | |
| 7,042,110 | B2 | | 5/2006 | Mikhail et al. | |
| 7,091,703 | B2 | | 8/2006 | Folts et al. | |
| 7,166,928 | B2 | * | 1/2007 | Larsen | ............................ 290/55 |
| 7,215,035 | B2 | * | 5/2007 | Hudson | ........................... 290/44 |
| 7,531,922 | B1 | * | 5/2009 | Olson | ........................... 307/157 |
| 2006/0103549 | A1 | * | 5/2006 | Hunt et al. | ................ 340/870.02 |
| 2007/0124025 | A1 | * | 5/2007 | Schram et al. | ................ 700/287 |
| 2009/0040029 | A1 | * | 2/2009 | Bridges et al. | ........... 340/310.11 |
| 2009/0160187 | A1 | * | 6/2009 | Scholte-Wassink | ............ 290/44 |
| 2010/0235008 | A1 | * | 9/2010 | Forbes, Jr. et al. | ............ 700/291 |
| 2011/0029655 | A1 | * | 2/2011 | Forbes, Jr. et al. | ............. 709/223 |
| 2011/0172841 | A1 | * | 7/2011 | Forbes, Jr. | ..................... 700/292 |

OTHER PUBLICATIONS

Overview of Facts Devices for Wind Power Plants Directly Connected to the Transmission Network, by Adamczyk et al., pp. 1-7, 978-1-4244-63923/10, 2010 IEEE.*

* cited by examiner

*Primary Examiner* — Ramesh Patel
(74) *Attorney, Agent, or Firm* — Occhiuti Rohlicek & Tsao, LLP

(57) ABSTRACT

A power plant for providing electric power to a power grid includes energy sources; power conditioning units and a controller configured to cause power provided to the grid to have selected electrical characteristics. The controller is in high speed real-time communication with the power conditioning units and programmed to provide instructions to the power conditioning units.

20 Claims, 4 Drawing Sheets

CENTRALIZED POWER CONDITIONING

CROSS-REFERENCE TO RELATED APPLICATIONS

This application claims the priority of U.S. Provisional Application No. 61/392,139, filed on Oct. 12, 2010, the contents of which are hereby incorporated by reference.

FIELD OF INVENTION

This disclosure relates to electric power distribution, and in particular, to power conditioning.

BACKGROUND

An electric utility typically purchases power from numerous power plants. These power plants are all connected to a power grid maintained and operated by the electric utility. The power plant makes electricity and delivers it to the grid.

Between a power plant and an electric utility lies a "point of interconnection." This is the point at which electrical power actually changes hands, from being under control of the power plant to being in control of the grid. Thus, by the time power reaches this point of interconnection, it is expected to be ready for distribution. This means the utility expects the delivered power to have certain electrical characteristics that render it suitable for distribution.

In addition, the electric utility expects the power plant to assist in supporting the grid in times of stress. For example, there may be electrical disturbances that require a rapid injection of reactive power or additional voltage to stabilize the voltage on the grid. The electric utility expects the power plant to be ready, willing, and able to provide reactive power or voltage support during such a disturbance. A power plant capable of functioning in this way is said to be "grid friendly."

Because of their years of experience with rotating machines, such as those used in conventional thermal power plants and hydroelectric power plants, electric power utilities have come to expect power plants to behave as if their power were generated using a conventional rotating machine. This expectation imposes a burden on purveyors of electricity produced by unconventional devices, such as fuel cells, photovoltaic cells, and wind turbines. Power produced by such devices does not always behave as if it were produced by a rotating machine. For example, photovoltaic cells naturally produce DC, whereas rotating machines naturally produce AC.

Requirements for grid connection have grown even more stringent over the years. In North America, the current trend is toward more rigid standards for wind and solar power supplies. An example of the evolving standards is the "Interconnection Standards Review Initiative, Draft Straw Proposal" as set forth by CAISO (California Independent System Operator) in the spring of 2010.

As a result of such standards, there is a growing need to provide ways for unconventional power sources to more closely match the electrical characteristics of rotating machines in order to participate in power distribution on a utility grid.

SUMMARY

In one aspect, the invention features a power plant for providing electric power to a power grid. Such a power plant includes energy sources; power conditioning units; and a controller configured to cause power provided to the grid to have selected electrical characteristics. The controller is in high speed real-time communication with the power conditioning units and programmed to provide instructions to the power conditioning units for execution within one cycle of line voltage.

Embodiments of the invention include those in which the energy sources include energy storage elements, those in which the energy sources include photovoltaic arrays, those in which the energy sources include wind turbines, and those in which the energy sources include fuel cells.

In other embodiments, the power inventers can include an inverter, a converter, an ancillary STATCOM device, a shunt bank, or any combination thereof.

In yet other embodiments, the power conditioning unit is connected to receive energy from an energy source.

Additional embodiments of the power plant include those in which the controller is configured to maintain an electrical condition at a point of interconnection with the grid, and wherein the controller is configured to instruct power conditioning units so as to cause the power conditioning units to cooperate in maintaining the electrical condition.

Also among the embodiments are those in which the controller is configured to instruct a power conditioning unit connected to an energy source to operate in a manner that worsens power factor as measured at the output of the power conditioning unit.

In yet other embodiments, the controller is configured to determine an optimal response to a transient voltage event.

Additional embodiments include those in which the controller is configured to cause the power conditioning units to provide unbalanced reactive power, and those in which the controller is configured to cause the power conditioning units to provide balanced reactive power.

In some embodiments, the power conditioning unit includes an inverter configured to receive electrical power generated by a wind turbine and to generate, from the electrical power, a voltage waveform having specified electrical characteristics.

In another aspect, the invention features a controller for controlling power conditioning units in a power plant, the controller being configured to cause power provided to the grid to have selected electrical characteristics, the controller being in high speed real-time communication with the power conditioning units and being programmed to provide instructions to the power conditioning units for execution within one cycle of line voltage.

Another aspect of the invention features a computer-readable medium having encoded thereon software for controlling power conditioning units in a power plant, the software including instructions for determining a response to a voltage event providing instructions to power conditioning units in response to the voltage event within one cycle of line voltage.

In some embodiments, the instructions further include instructions for causing the at least one of the power conditioning units to supply unbalanced reactive power.

In other embodiments, the instructions further include instructions for responding to a voltage event at a point-of-interconnection with a power grid.

These and other features of the invention will be apparent from the following detailed description and the accompanying figures, in which:

DETAILED DESCRIPTION

The power plant described herein is described as using photovoltaic cells. However, the control system described herein for controlling the power plant does not rely on any particular form of power generation. Accordingly, the power plant could include wind turbines, fuel cells, hydroelectric generators, or conventional rotating machines driven by fossil fuel or nuclear energy.

Figure 1:
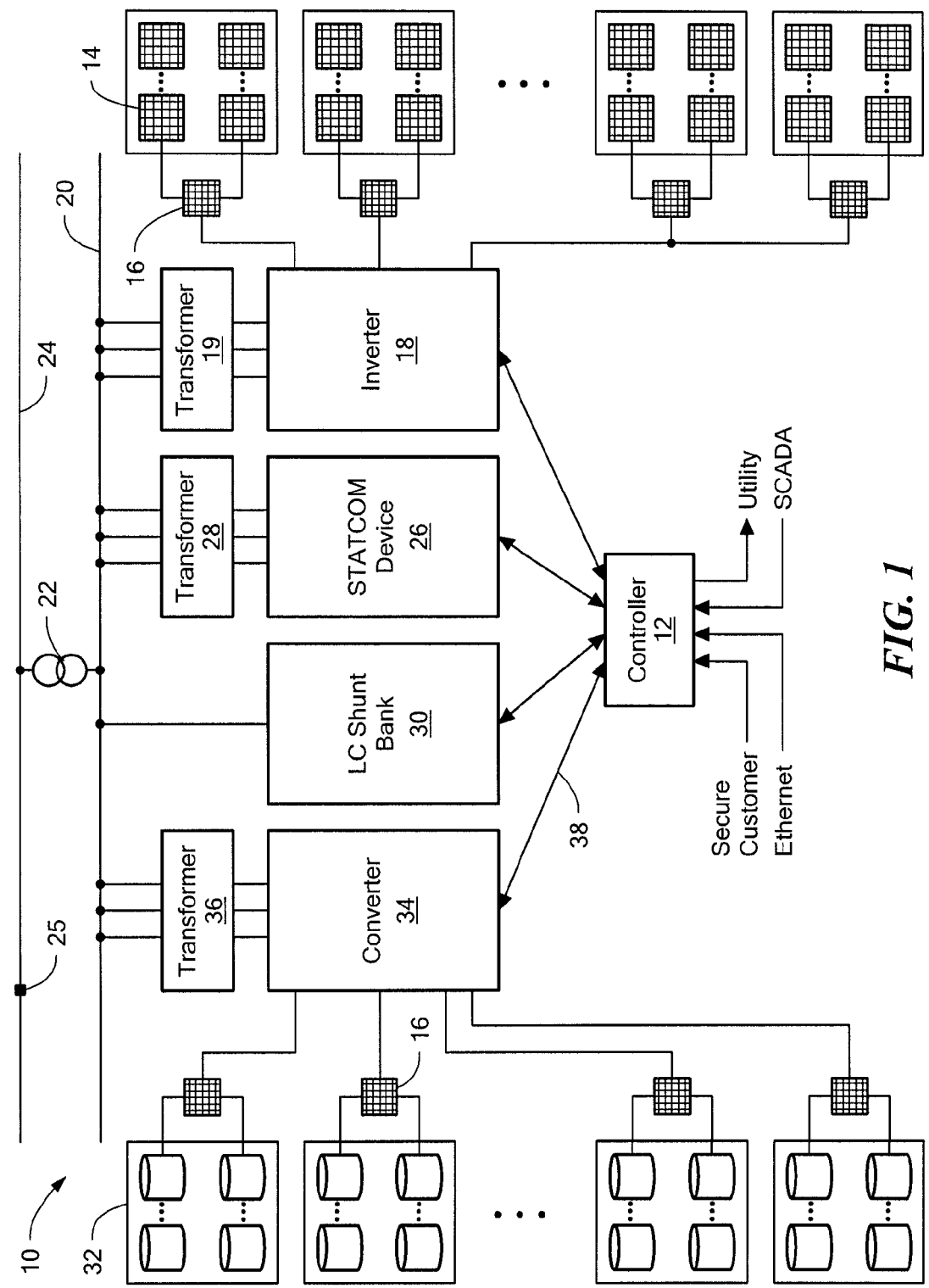
FIGS. 1-3 show embodiments of a power plant.

A power plant 10 controlled by a central controller 12, shown in FIG. 1, includes arrays 14 of photovoltaic modules. The outputs of each array 14 are fed into a combiner 16, which then feeds into an inverter 18. Alternatives to a combiner 16 include a DC-to-DC module for localized Maximum Power Point Tracking (MPPT) and/or boosting voltage in response to, for example, passage of a cloud over the corresponding portion of the solar array 14, thus keeping the DC voltage level delivered to the inverter 18 constant.

The inverter 18 accepts a DC input and provides an AC output. In the resulting AC output, the inverter 18 can also control the phase angle between the output voltage and current waveforms. Accordingly, by controlling this angle, the inverter 18 outputs either purely real power, purely reactive power, or anything in between. A suitable inverter 18 is the SolarTie™ inverter 18 rated at 1.4 MW and manufactured by American Superconductor Corporation, of Devens, Mass.

The output of the inverter 18 is then provided to a first transformer 19 for coupling onto a medium-voltage transmission line 20. In some embodiments, the medium-voltage transmission line 20 carries 34.5 kilovolts. A second transformer 22 couples the medium-voltage transmission line 20 to a high-voltage transmission line 24 at 138 kilovolts. The point-of-interconnection 25 with the power grid lies on this high-voltage transmission line 24.

Although FIG. 1 shows solar arrays connected to the inverter 18, the inverter 18 can accept power from other energy sources. Accordingly, the solar plant can be replaced with a wind plant, arrays of fuel cells, energy storage elements, such as batteries, or any combination thereof.

The power plant 10 also includes an ancillary reactive current source, such as a STATCOM ("static synchronous compensator" device 26, that provides only reactive power. An ancillary STATCOM 26 imposes dynamically changing reactive current on the circuit to which it connects. The STATCOM device 26 changes this reactive current quickly in response to changes in the circuit. The output of the ancillary STATCOM device 26 is then provided to a third transformer 28 for distribution onto the medium-voltage transmission line 20. A suitable ancillary STATCOM device is the D-VAR®, manufactured by American Superconductor Corporation, of Devens, Mass.

In some power plants, additional reactive power can be provided by a bank of capacitors and/or inductors, herein referred to as a "shunt banks" 30 that can be selectively switched into the transmission line 20 to either absorb or inject reactive power. The shunt bank 30 can thus be viewed as functioning like an ancillary reactive device 26, though with slower response.

In some power plants, arrays of energy storage elements 32, such as batteries, connect to a converter 34, the output of which connects to a fourth transformer 36 for coupling onto the medium-voltage transmission line 20. The converter 34 converts DC power from the energy storage elements 32 into AC power for distribution on the grid. Conversely, the converter 34 absorbs AC power from the grid and stores it in the energy storage elements 32.

Although FIG. 1 shows one inverter 18 with an associated set of photovoltaic arrays 14, a power plant 10 can have many inverters 18 and many photovoltaic arrays 14 spread over a large area. Similarly, a power plant 10 can also have many converters 34 and energy storage elements 32, shunt banks 30 and ancillary STATCOM devices 26 distributed over a large area.

In a power plant 10, the various inverters 18, ancillary STATCOM devices 26, shunt banks 30, converters 34, and DC-to-DC modules 16, hereafter referred to collectively as "power conditioning units," cooperate to condition power at the point-of-interconnection 25. A pair of optical fibers 38 connects each power conditioning unit to the central controller 12. This enables full duplex communication between the controller 12 and each power conditioning unit, and avoids delays caused by two or more power conditioning units having to share the same physical transmission medium.

Typically, the central controller 12 is installed in a substation control building. From there, it monitors substation and transmission voltages and currents. Based on the instantaneous state of the grid, which it derives from measurements of voltages and currents, the controller 12 issues instructions to the power conditioning units. It does so by communicating on the fibers 38 using a high speed real-time protocol.

Rapid communication between the central controller 12 and the power conditioning units can be achieved using known high-speed communication networks, such as EtherCAT™, PROFINET™, and RTnet™. Other communication protocols can be used provided they permit a controller 12 to broadcast updates to numerous nodes, often in excess of 100 nodes, at rates that are sub-line cycle.

The power conditioning unit includes a local controller that can receive and process the communication data, and that, in some cases, can determine what needs to be done to achieve any requested output. If necessary, the local controller can override a request in order to protect the power conditioning unit from unacceptably high or low voltage, or other damaging conditions. Status information can be communicated back from the local controllers at the power conditioning units to the central controller 12 to be used in further refining outputs requested by the central controller 12.

The local controller can control injection of reactive power by controlling any one or more of the following: several switch-stages of which are often present in an induction-based wind turbine generators; a line-side converter typically found in double-fed induction generators, any excess capacity of which can be used to generate reactive power; a small additional inverter-based ancillary reactor associated with, for example, an inverter in a wind-turbine or a solar inverter; or by controlling a full converter, such as that typically found in a permanent magnet generator. In the case of inverter generated reactive currents, the output can be directed to be either balanced or unbalanced so as to address transient and/or steady-state unbalanced voltage conditions.

As used herein, a high speed network is one that permits essentially real-time control with instructions being executed within the span of less than one cycle of a 60 Hz voltage waveform. The use of such high-speed networks permits power conditioning units throughout the power plant to cooperate in achieving both global steady state voltage regulation and rapid dynamic transient response at the point-of-interconnection. Power conditioning units such as inverters, which formerly could only be used to provide local power factor control, can participate in achieving system wide power factor or voltage control for both steady-state operation and for responding to transients or post fault support of grid voltage.

The central controller 12 also communicates with points outside the power plant 10 through a communication port. For example, the controller 12 can provide diagnostic and operational data to a remotely located maintenance office, and can also receive instructions for that office. In addition, the controller 12 can exchange data with the electric utility.

The central controller 12 provides instructions to each power conditioning unit for controlling its operation. It does so in part on the basis of data received from the various power-conditioning units themselves, through a SCADA (Supervisory Control and Data Acquisition) interface, and also in part on the basis of data representing the conditions at the point-of-interconnection 25. The controller 12 also collects any local diagnostic data and system control data, as well as historical data.

The central controller 12 can thus adaptively orchestrate the manner in which the various power conditioning units cooperate with each other in an effort to cause the power plant 10 to meet the utility's expectations. For example, the central controller 12 chooses, from among the many possible sources of reactive power within the plant, the particular source or sources of reactive power that are to be used to correct a condition at the point-of-interconnection 25. This choice changes dynamically as circumstances change.

For example, if an inverter 18 becomes unavailable because it is busy supplying real power, the controller 12 can determine what other power conditioning units are available. It can then instruct a suitable power conditioning unit, such as a static shunt or static VAR, to supply the reactive power. In some cases, multiple sources of reactive power are needed, in which case the controller 12 seamlessly coordinates the operation of the various power conditioning units in a way that meets the utility's expectations.

As an example, the inverters 18 may suddenly be called upon to use all their capacity to produce real power. In such a case, the controller 12 can adaptively instruct another power conditioning unit, such as a static shunt or static VAR, to contribute its efforts toward maintaining a suitable power factor. Or in other cases, the inverters 18 may have capacity to spare, in which case the controller 12 can call upon them to supply either balanced or unbalanced reactive power, thus saving the STATCOM devices 26, shunt banks 30, and converters 34 for different purposes or for emergencies. All settings for these and other operations are available through the SCADA interface.

In addition to its role in controlling reactive power, the controller 12 also plays a role in voltage regulation. Precise voltage regulation at the point-of-interconnection 25 is not easy. Such voltage regulation requires careful orchestration of multiple reactive power sources on the power plant 10. If improperly carried out, this can cause negative interactions between power-conditioning units. As a result, the power plant 10 may fail to meet interconnection requirements. In extreme cases, an improper attempt at voltage regulation can damage the solar power plant components or the utility equipment.

The problem becomes more difficult in the case of photovoltaic arrays 14, in large part because of transient power loss caused by passing clouds. Since a photovoltaic array 14 does not store any energy, as is the case in a spinning rotor, changes in solar output power can be abrupt and severe. These abrupt voltage changes can disturb the voltage at the point-of-interconnection 25.

A central controller 12 as described herein carries out transient voltage control. To do so, the controller 12 monitors the voltage at the point-of-interconnection 25 and calculates the effect of additional reactive power on the voltage at the point-of-interconnection 25. In the event of balanced and unbalanced voltage sags or swells, the central controller 12 can determine the correct amount of balanced and/or unbalanced reactive response and instruct an inverter 18 associated with in inverter-based component to respond accordingly in a way that best addresses the event as seen at the point-of-interconnection 25. If that voltage changes, for example, as a result of a passing cloud, the controller 12 determines the amount of reactive power needed to regulate the voltage. It also determines whether real power is required and if there are any underutilized photovoltaic arrays 14 or any energy storage elements 32 that can provide such power. Having done so, the controller 12 communicates with a subset of conditioning units on the power plant 10 and causes one or more of those conditioning units to provide the requisite reactive power. The controller 12 also monitors frequency at the point-of-interconnection 25, and instructs the appropriate power conditioning units to correct the frequency as needed. These steps are executed multiple times within a cycle of the desired electrical output. Once the transient voltage event is complete, the controller 12 sends a message to the power conditioning units to instruct them to resume normal operation.

Conventional solar inverters lack the ability to ride through voltage disturbances. Although many inverters include a software switch to disable automatic tripping during transient voltage events of limited swing, such conventional inverters lack the ability to not only stay on line but to also to support and stabilize system voltage by injecting or absorbing reactive power as needed. Unlike conventional inverters, the inverter 18 described herein provides both real power and reactive power. Accordingly, the solar inverters 18 disclosed herein participates in stabilizing grid voltage, and in part as a result of the high speed network connecting them to the controller 12, does so with control loop speeds that are sub-line cycle.

The controller 12 in communication with the power conditioning units as described herein provides the system operator with sufficient flexibility to provide reactive power to assist in stabilizing the grid and to switch back to real power production when the grid voltage has stabilized.

The system described herein also avoids many undesirable effects of switched shunt devices, such as the shunt bank 30, that are commonly used for managing supply of reactive power. Such shunt devices function as reservoirs of reactive power that are switched into the grid at strategic times to inject or absorb reactive power on an as-needed basis. However, switching leads to transients, which in turn can give rise to flicker.

To avoid or reduce such flicker, the controller 12 implements procedures disclosed in one or more of U.S. Pat. Nos. 7,091,703; RE41,170; 7,265,521; 7,091,703; 6,987,331; 6,906,434 6,900,619; 6,600,973; 6,577,108; and 6,414,853 the contents of all of which are herein incorporated by reference. Using the procedure, the controller 12 recognizes when a shunt bank 30 will be switched into or out of the grid and uses ancillary reactive power units to offset the effect of the switching. This results in smoother and more flicker-free voltage.

Figure 2:
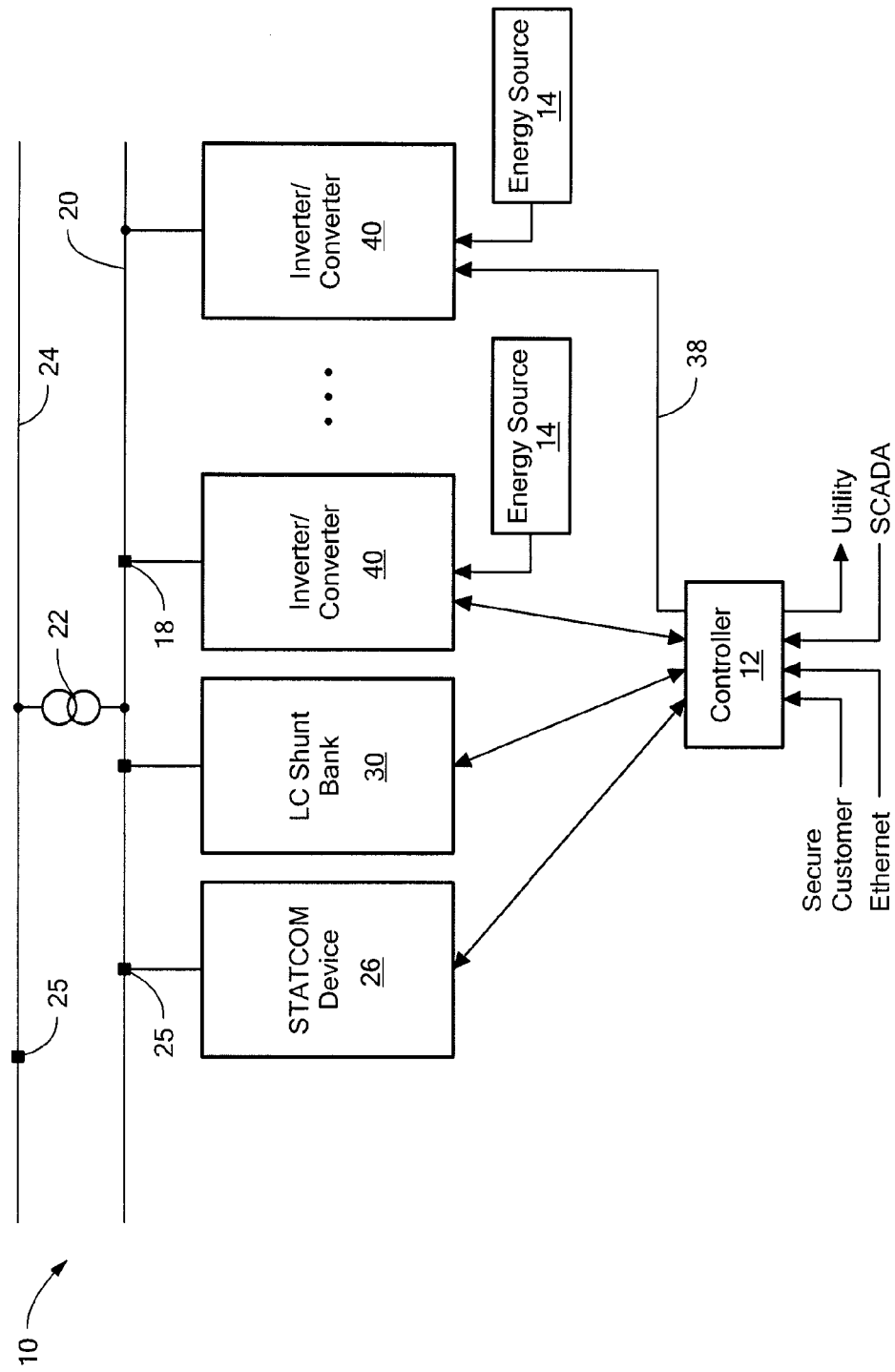

In another embodiment, shown in FIG. 2, a plurality of combined inverter/converter units 40 is connected to a corresponding plurality of energy sources 14. The energy sources 14 can be any combination of solar energy sources, wind turbines, fuel cells, rotating machines, and energy storage elements such as batteries. The operation of the embodiment shown in FIG. 2 is substantially along the lines discussed in connection with FIG. 1.

Figure 3:
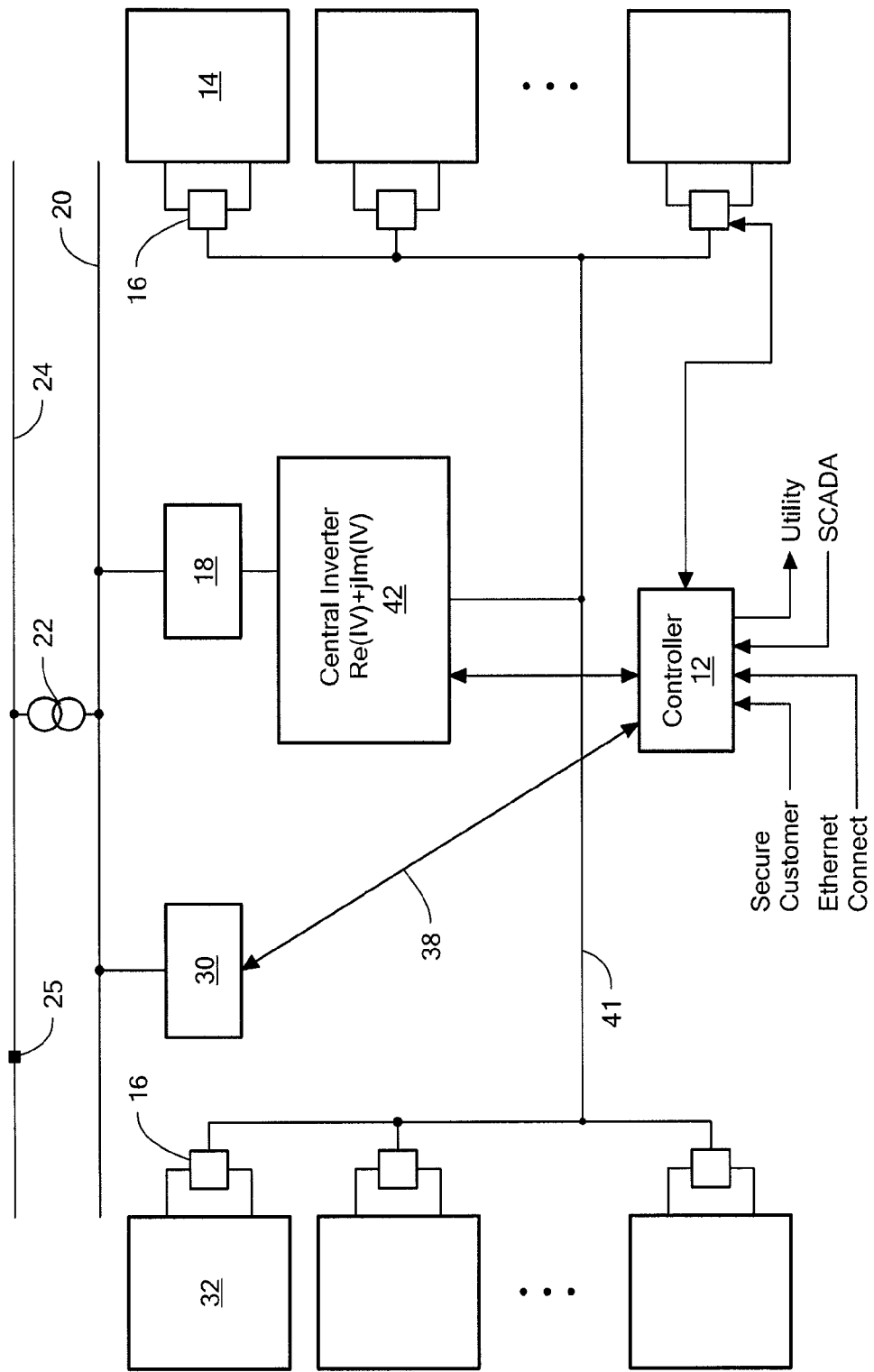

In yet another embodiment, shown in FIG. 3, both power sources 14 and energy storage elements 32 are connected, via a common bus 41, to a central inverter 42 that provides both real and reactive power. Unlike the embodiments shown in FIGS. 1 and 2, the embodiment in FIG. 3 omits an ancillary reactor and relies exclusively on the central inverter 42 to generate appropriate reactive power.

Figure 4:
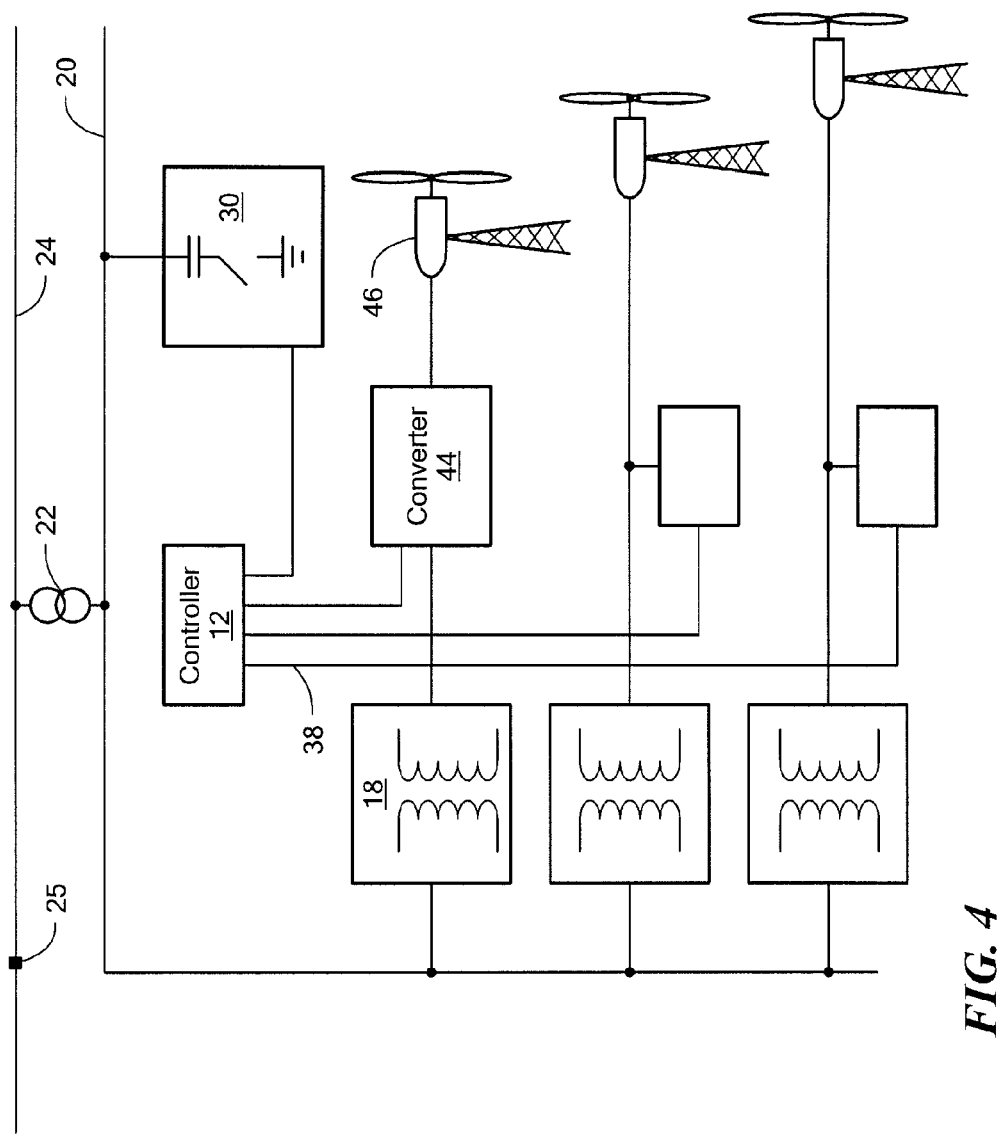
FIG. 4 shows a wind-turbine having a converter.

In some embodiments, as shown in FIG. 4, one can avoid providing ancillary STATCOM devices reactors 26 and/or shunt banks 30, or reduce the number of ancillary STATCOM devices 26 and/or shunt banks 30, by using inverters 44 that are already associated with wind turbines 46. These wind-turbine converters 44 respond to instructions from the controller 12 to function as ancillary reactors 26 in an effort to cause a particular condition, or to contribute to causing a particular condition, at the point-of-interconnection 25. Moreover, since these wind-turbine converters 44 can receive power from the grid, they can function as ancillary STATCOM devices 26 even when the wind turbine 46 is not operating.

Operation intended to cause or contribute to causing a particular condition at the point-of-interconnection 25 is different from simply operation intended to optimize conditions at the wind turbine itself. Since the point-of-interconnection 25 is on the high-voltage transmission line 24, and the converter 44 is isolated from the high-voltage transmission line 24 by a transformer 18, the wind-turbine converter 44 has no way of knowing how it could contribute to achieving a particular condition at the point-of-interconnection 25.

It is in part for this reason that the central controller 12 becomes useful. The central controller 12 has information concerning the voltage at the point-of-interconnection 25, as well as conditions throughout the power plant 10. On the basis of such information, and on the basis of its knowledge about the capabilities of the various power conditioning units on the power plant 10, the central controller 12 instructs the wind-turbine converter 44 on exactly what it should do to contribute towards achieving the goal of having specified conditions at the point-of-interconnection 25.

Having described the invention, and a preferred embodiment thereof, what is claimed as new, and secured by Letters Patent is:

1. A power plant for providing electric power to a power grid, said power plant comprising: energy sources; power conditioning units; and a controller configured to cause power provided to the grid to have selected electrical characteristics, said controller being in high speed real-time communication with said power conditioning units and being programmed to provide instructions to said power conditioning units for execution within one cycle of line voltage.

2. The power plant of claim 1, wherein the energy sources comprise energy storage elements.

3. The power plant of claim 1, wherein the energy sources comprise photovoltaic arrays.

4. The power plant of claim 1, wherein the energy sources comprise wind turbines.

5. The power plant of claim 1, wherein the energy sources comprise fuel cells.

6. The power plant of claim 1, wherein the power conditioning unit comprises an inverter.

7. The power plant of claim 1, wherein the power conditioning unit comprises a converter.

8. The power plant of claim 1, wherein the power conditioning unit comprises an ancillary STATCOM device.

9. The power plant of claim 1, wherein the power conditioning unit comprises a shunt bank.

10. The power plant of claim 1, wherein the power conditioning unit is connected to receive energy from an energy source.

11. The power plant of claim 1, wherein the controller is configured to maintain an electrical condition at a point of interconnection with the grid, and wherein said controller is configured to instruct power conditioning units so as to cause the power conditioning units to cooperate in maintaining the electrical condition.

12. The power plant of claim 1, wherein the controller is configured to instruct a power conditioning unit connected to an energy source to operate in a manner that worsens power factor as measured at the output of the power conditioning unit.

13. The power plant of claim 1, wherein the controller is configured to determine an optimal response to a transient voltage event.

14. The power plant of claim 1, where the controller is configured to cause a power conditioning unit to provide unbalanced reactive power.

15. The power plant of claim 1, where the controller is configured to cause a power conditioning unit to provide balanced reactive power.

16. The power plant of claim 1, wherein the power conditioning unit comprises an inverter configured to receive electrical power generated by a wind turbine and to generate, from said electrical power, a voltage waveform having specified electrical characteristics.

17. A controller for controlling power conditioning units in a power plant, said controller being configured to cause power provided to the grid to have selected electrical characteristics, said controller being in high speed real-time communication with said power conditioning units and being programmed to provide instructions to said power conditioning units for execution within one cycle of line voltage.

18. A non-transitory computer-readable medium having encoded thereon software for controlling power conditioning units in a power plant, said software comprising instructions for determining a response to a voltage event, and causing power conditioning units to respond to the voltage event within one cycle of line voltage.

19. The computer readable medium of claim 18, wherein the instructions further comprise instructions for causing at least one of the power conditioning units to supply unbalanced reactive power.

20. The computer readable medium of claim 18, wherein the instructions further comprise instructions for responding to a voltage event at a point-of-interconnection with a power grid.

* * * * *